Sept. 7, 1937.　　　C. D. STEWART　　　2,092,381
VEHICLE CONTROL APPARATUS
Filed March 5, 1936　　　2 Sheets-Sheet 2
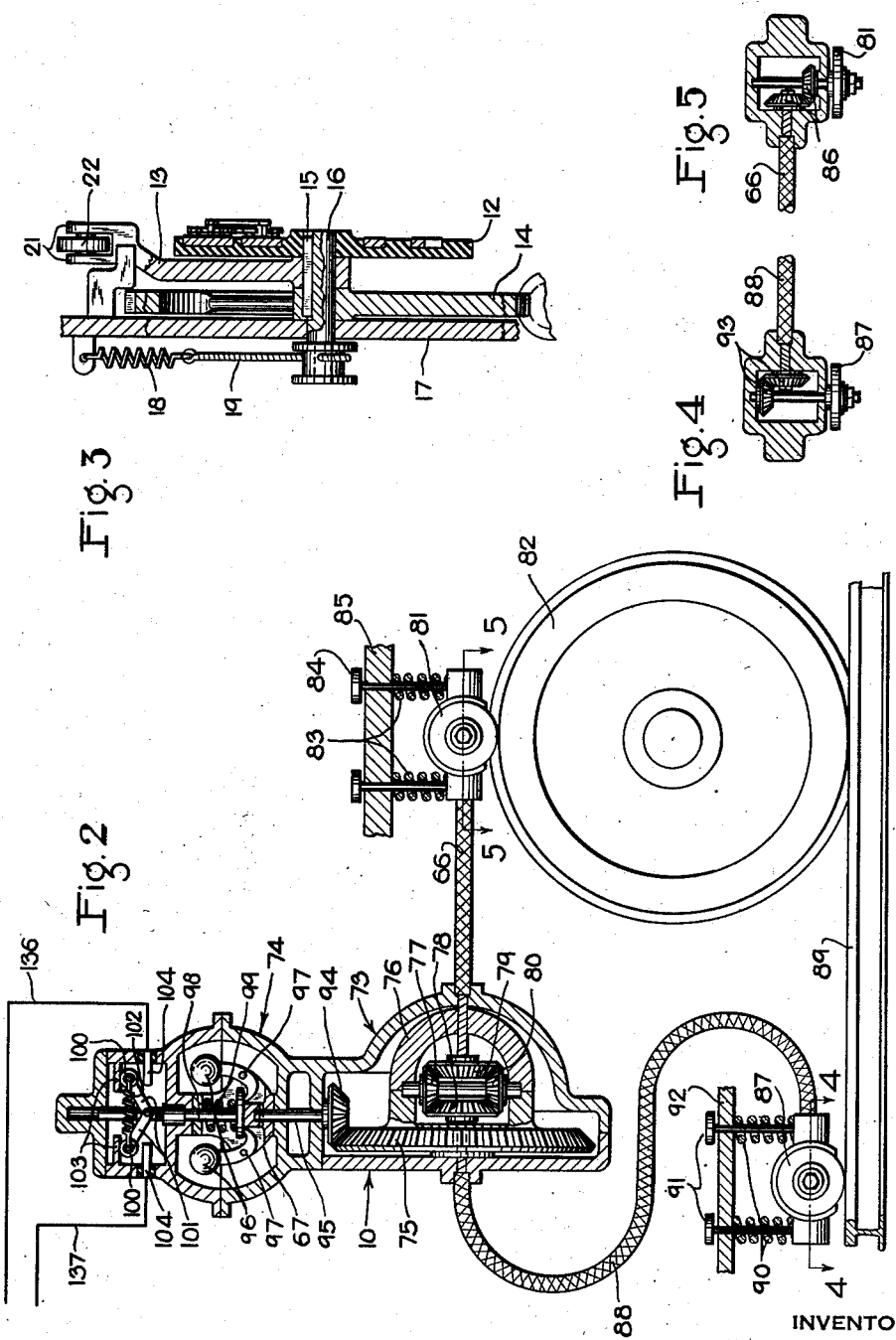
INVENTOR
CARLTON D. STEWART
BY　*Wm. H. Cady*
ATTORNEY Patented Sept. 7, 1937

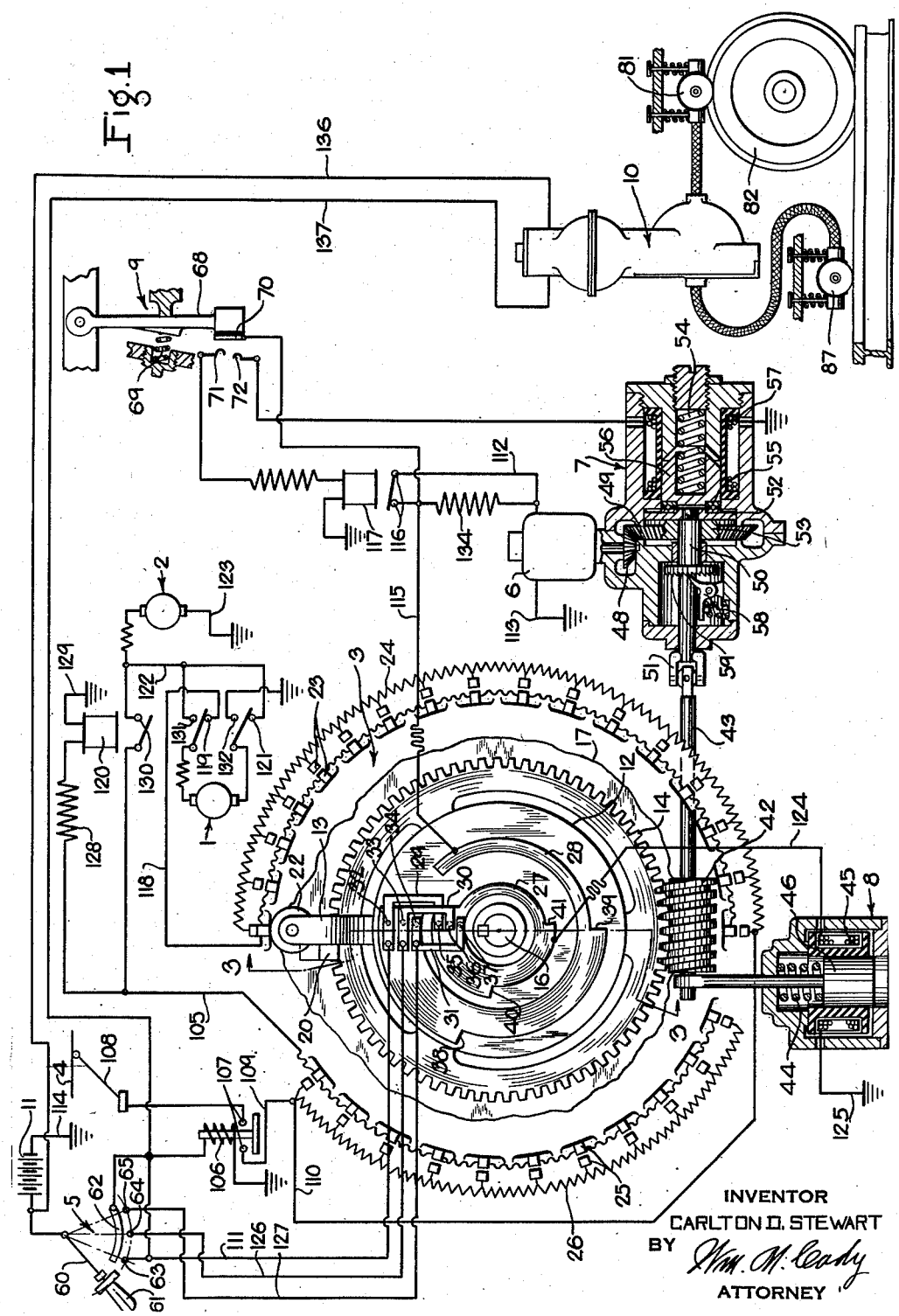

2,092,381

UNITED STATES PATENT OFFICE 2,092,381

VEHICLE CONTROL APPARATUS

Carlton D. Stewart, Swissvale, Pa., assignor to The Westinghouse Air Brake Company, Wilmerding, Pa., a corporation of Pennsylvania Application March 5, 1936, Serial No. 67,263

18 Claims. (Cl. 105—61)

This invention relates to vehicle control apparatus, and more particularly to apparatus for controlling the slipping or sliding of vehicle wheels due to an application of the brakes.

In order to stop modern high speed trains in a reasonably short distance from high speeds it is necessary to employ higher rates of retardation than heretofore employed in common practice for similar trains. When decelerating at these high rates of retardation the danger of causing wheel slipping or sliding is greatly increased. As a consequence of this condition it becomes more desirable to provide automatic means for minimizing the possibility of wheel slipping or sliding.

The term wheel slipping as here used refers to the condition of a wheel which is rotating but at a speed below that corresponding to the speed of the vehicle, that is, at a speed below that of wheels which are not slipping. This condition is also sometimes referred to as an incipient stage of wheel sliding. The term wheel sliding as here used refers to the condition where a wheel is not rotating at all, that is, a locked wheel.

Wheel slipping is objectionable because the retarding force produced by a slipping wheel when the brakes are applied is considerably less than that of the wheel when rolling at normal speed. Wheel sliding is objectionable not only because of the reduced retarding force, but also because flat places are worn on the treads of the sliding wheel, thereby rendering it unfit for regular service. In order to produce the maximum possible retarding force it is therefore desirable that all wheels be kept rolling.

There have heretofore been proposed a number of devices for releasing the brakes on wheels during an incipient stage of wheel sliding, and for reapplying the brakes on these wheels when the slipping or sliding condition has passed. When a wheel begins to slip the adhesion between the wheel and rail becomes that corresponding to kinetic friction, whereas the adhesion between a non-slipping wheel and a rail is that corresponding to static friction. Because of this phenomenon, if with the devices heretofore proposed the wheel sliding condition is to be remedied in the incipient stage, so that the wheel may again rotate at normal speed, it is necessary to reduce the degree of braking on the wheel to a very low value. As a consequence of this much of the retarding force which could be produced by such a wheel is lost for a considerable period of time.

If when a wheel commences to slip, and before it reaches a sliding stage, a sufficient rotational force is applied to the wheel to cure the slipping condition, without at the same time diminishing the braking force applied to the wheel, then a greater retarding force will be produced by the wheel, and hence a shorter stop will be made by the vehicle or train. A principal object of the present invention is to provide means for applying a predetermined rotational force to wheels which commence to slip.

In modern high speed trains, particularly those of the light weight, articulated type, a relatively heavy motor car is usually provided and coupled through articulations to a series of relatively light weight, trailer cars. The additional weight of the motor car over that of a trailer car is essentially due to the power unit and driving motors on this car. The load in the motor car is practically constant whereas the load in a trailer car usually varies over wide limits. Because of this it is proposed that the brakes on the trailer cars be adjusted so as to not cause wheel sliding when lightly loaded, whereas on the motor car it is proposed that the brakes be adjusted to produce all the braking that the car weight will permit. The danger of wheel sliding on the motor car is thus increased.

The motor car is usually provided with one or more trucks equipped with the driving motors, each truck having two or more axles with one or more motors coupled to each axle. If therefore when the wheel or wheels associated with one axle begin to slip, sufficient power is supplied to the motor or motors associated with that axle to just maintain the wheels rolling at normal speed, then the brakes on these wheels may remain applied without producing wheel sliding. It is, therefore, a further object of the invention to provide means for supplying a limited amount of power to the vehicle driving motors associated with wheels which commence to slip.

Further objects of the invention, dealing with specific constructions and arrangements of parts for generally carrying out the aforestated objects, will be apparent from the following description, which is taken in connection with the attached drawings, wherein Fig. 1 shows in schematic and diagrammatic form an embodiment of the invention illustrated in connection with a single vehicle axle.

Fig. 2 is an enlarged diagrammatic view of the differential device shown to the lower right of Fig. 1.

Fig. 3 is a view taken along the line 3—3 of

Fig. 1, showing in section a portion of the notching controller.

Figs. 4 and 5 show in diagrammatic form, respectively, views along the lines 4—4 and 5—5 of Fig. 2.

I have illustrated my invention in connection with a motor acceleration control system which is described and claimed in the pending application of Ellis E. Hewitt, Serial No. 717,758, filed March 28, 1934. As described in that application the motor control system may comprise two driving motors 1 and 2, a notching controller 3, which functions to control the supply of current from an overhead trolley 4 to the driving motors, and a master controller 5, for controlling operation of the notching controller. A control motor 6 operates through a gear and clutch mechanism 7 to drive the notching controller 3 in response to operation of the master controller 5, while a gear engaging mechanism 8 functions to engage and disengage the gear and clutch mechanism 7 from the notching controller. An inertia operated device 9 is provided for preventing the rate of acceleration of the vehicle from exceeding a predetermined or chosen value.

To the motor control system of the aforesaid pending application, I have added a wheel slipping detector mechanism 10 which functions to effect operation of the motor control system upon slipping of a vehicle wheel.

For the sake of clarity it will be assumed that the driving motors 1 and 2 are associated with a single vehicle axle and that the wheel slip detecting mechanism 10 is associated with this same axle.

Considering first the description of the motor control system, the notching controller 3 comprises a contact segment plate 12, preferably made of some insulating material, an arm 13, and a gear 14, all of which are secured by a key 15 to a shaft 16. The shaft 16 is rotatable in a housing 17 and normally urged in a counterclockwise direction (as viewed in Fig. 1) by a spring 18 and cable 19, so as to position the arm 13 against a stop 20. The arm 13 carries between bifurcations 21 a roller 22, which is adapted to engage and close sequentially contacts 23, for the purpose of cutting out of circuit portions of a resistance 24, during the first 180 degrees rotation of arm 13, and to thereafter upon further rotation of the arm close sequentially contacts 25 to cut out of circuit portions of a resistance 26.

Contact plate 12 carries two stepped contact segments 27 and 28. Three stationary jumpers 29, 30 and 31 span over these two contact segments. The three jumpers are provided with brushes 32, 33 and 34, respectively, which engage the contact segment 28, and with three brushes 35, 36 and 37, respectively, which engage the contact segment 27. When the shaft 16 has been rotated in a clockwise direction through a predetermined angle, the brush 32 will disengage from the segment 28 at the step 38. Upon further rotation of shaft 16, the brush 33 will disengage from the segment 28 at the step 39. When the shaft has rotated through a little less than 360 degrees, the brush 34 will disengage from the segment 28.

In a like manner, shortly after brush 32 has disengaged from the segment 28, the brush 35 disengages from the segment 27 at the step 40. Shortly after brush 33 disengages from segment 28 at step 39 the brush 36 disengages from the segment 27 at step 41. The brush 37 is at all times in engagement with the segment 27.

The gear 14 is driven through a worm 42 secured to a shaft 43. The worm 42 is normally maintained out of mesh with the gear 14 by a spring 44 in the gear engaging mechanism 8. To engage the worm 42 with the gear 14, a winding 45 is energized to thus attract a core 46 upwardly to overcome the bias of the spring 44.

The shaft 43 is rotated by the motor 6 through the gear and clutch mechanism 7. This mechanism includes a gear 48 driven by the motor 6 and in mesh with a second gear 49 overrunning a shaft 50 coupled to the shaft 43 through a universal joint 51. Secured to the shaft 50 is a clutch plate 52, which is normally held in constant engagement with a second clutch plate 53 integral with the gear 49. A spring 54 operating through a ball bearing 55 at the end of a movable magnetic core 56 holds the two clutch plates in engagement, so that when motor 6 is operated shaft 43 and worm 42 are similarly rotated at a reduced speed, according to the ratio of gears 48 and 49.

When current is supplied to a winding 57 the magnetic core 56 is attracted to the right, overcoming spring 54, to thereby interrupt the friction coupling between the two clutch plates 52 and 53. The motor 6 then no longer drives the worm 42. In order to prevent the spring 18 from returning the arm 13 of the notching controller back to its biased position a spring biased finger 58 is provided, which engages a circular ratch 59. When, however, the winding 45 in the gear engaging mechanism 8 is deenergized the spring 18 may return the arm 13 to its biased position.

The master controller 5 comprises essentially a contact arm 60 movable by a handle 61. When this handle is moved to any accelerating position the contact arm 60 engages a contact segment 62, while in either of three accelerating positions it engages one of three contact fingers 63, 64 or 65.

The inertia operated device 9 may comprise a pendulum 68 so arranged as to be movable to the left according to the rate of acceleration of the vehicle, this movement being opposed by a calibrated spring 69. The pendulum 68 carries a contact 70 which upon movement through a predetermined distance engages a stationary contact 71, and upon further movement engages a second stationary contact 72.

The wheel slip detecting mechanism 10 comprises a differential gear section 73, and a centrifuge section 74. The differential gear section 73 may comprise a differential gear mechanism of a type commonly employed in automobiles, and may include a ring gear 75 carried by a differential housing 76. In the differential housing are suitably mounted the differential gears 77, 78, 79 and 80. These gears are grouped in the manner commonly employed in differential gear mechanisms.

The differential gear 79 is mechanically coupled to a tracer wheel 81 through a flexible shaft 66. The tracer wheel 81 is held in engagement with the tread of a vehicle wheel 82 by springs 83. These springs may be disposed on pins 84 and react against a suitable supporting structure 85, to force the tracer wheel into engagement with the wheel tread. As shown in Fig. 5, the flexible shaft 66 may be coupled to the tracer wheel through suitable bevel gears 86.

The differential gear 78 is mechanically coupled to a second tracer wheel 87 through a flexible shaft 88. This tracer wheel is held in rolling contact with a track rail 89 by springs 90 disposed on pins 91, and reacting against a suitable support 92. The flexible shaft 88 may be coupled to the tracer wheel 87 through suitable bevel gears 93, as shown in Fig. 4.

When both tracer wheels 82 and 87 are rotating at the same speed the ring gear 75, and connected housing 76, will remain motionless. When either of the tracer wheels is rotating at a greater or lesser speed than the other, the ring gear and housing will be rotated at a speed according to the differential of speed between the two tracer wheels. It is to be noted that the ring gear 75 and its housing 76 overrun the two flexible shafts 66 and 88, as is common practice in differential gear mechanisms of this type.

The ring gear 75 meshes with a similar bevel gear 94 secured to a shaft 95 in the centrifuge section 74. The shaft 95 has connected thereto, and rotatable therewith, a member 67 carrying a set of centrifuge weights 96 supported by arms pivotally mounted at 97. When the shaft 95 is rotated the centrifuge weights 96 move outwardly due to centrifugal force and thereby cause upward movement of a plunger 98 against the bias of a spring 99.

The plunger 98 carries two arms 101, which are insulated from the plunger, each of which carries a roller 100, the two rollers being connected by a spring 102. In the illustrated position the rollers 100 are in engagement with stops 103. When the plunger 98 has been moved upwardly far enough for the fulcrum point of the arms 101 to pass over dead center, the spring 102 pulls the two rollers 100 downwardly with a snap action to engage contacts 104. This operation is intended to take place at a relatively low speed of rotation of the ring gear 75, corresponding to a predetermined differential in speed of rotation between the two tracer wheels 81 and 87.

The operation of this embodiment of my invention is as follows:

*Normal acceleration control*

The vehicle is normally accelerated by moving the handle 61 of the master controller 5 to one of its three acceleration positions. Assuming now that the handle is moved to its first acceleration position, the contact arm 60 engages both the contact segment 62 and the contact finger 63. Engagement with the contact segment 62 energizes a relay 106, which closes its contacts 107. Closing of these contacts connects the motors 1 and 2 to the overhead trolley conductor 4, through a circuit which includes a trolley 108, contacts 107 of relay 106, conductors 109 and 110, all of resistance 24, the one set of contacts 23 illustrated as closed by the roller 22, conductor 118, contact 119 of relay 120, the motor 1, relay contact 121, conductor 122, the motor 2, and ground connection 123. It will thus be noted that the motors 1 and 2 are initially energized in series with each other and in series with all of the resistance 24.

Engagement of the contact arm with the contact finger 63 causes energization of control motor 6 and the winding 45 in the gear engaging mechanism 8. The motor 6 is energized through a circuit, which beginning from battery 11 includes, contact arm 60, contact finger 63, conductor 111, brush 32, contact segment 28, conductor 115, contacts 116 of relay 117, conductor 112, motor 6, and ground connection 113, which forms a return connection to the grounded terminal 114 of battery 11.

The circuit to the winding 45 includes beginning at brush 32, jumper 29, brush 35, contact segment 27, conductor 124, winding 45, and ground connection 125.

Energization of winding 45 attracts core 46 upwardly to cause engagement of worm 42 with gear 14, as illustrated. Energization of the control motor 6 causes rotation of the gear 14, through the gear and clutch mechanism 7. The arm 13 will then rotate in a clockwise direction to sequentially close the contacts 23. When the arm 13 has rotated through a predetermined angle, brush 32 reaches the step 38 and disengages from the segment 28. This interrupts the circuit to the motor 6 and rotation of arm 13 is arrested. The finger 58 and the friction of the parts hold the arm in its arrested position.

If the master controller handle 61 is now moved to its second accelerating position, the motor 6 is re-energized through a circuit including conductor 126 and brush 33. The arm 13 is then further rotated until it will have rotated through a total of 180 degrees, at which time brush 33 reaches the step 39 and passes out of engagement with the segment 28. At this point all of resistance 24 will have been cut out of circuit, so that the series combination of the two driving motors is connected directly to the trolley conductor 4.

If now the motor controller handle 61 is moved to its third accelerating position, the motor is re-energized through a circuit including conductor 127 and brush 34. The arm 13 will then be rotated to where it engages the first of the contacts 25. Upon engagement with this contact it will be observed that a circuit will be formed from the trolley conductor 4 to the relay 120, which circuit includes all of the resistance 26, conductor 105, resistance 128, relay 120, and ground connection 129. The relay 20 will thus be energized and will close its contacts 130, 131 and 132.

Closing of these contacts connects the two motors 1 and 2 in a parallel combination, as will be obvious from the circuits shown. Thus as the arm 13 rotates beyond the 180 degree point, the motors will be connected in a parallel combination in series with the resistance 26, which will gradually be cut out of circuit as the arm rotates further. When the arm closes the last of the contacts 25 the brush 34 will disengage from the contact segment 28 and thus de-energize motor 6.

It will be observed that shortly after each of the brushes 32, 33 and 34 disengage from the segment 28 that the brushes 35, 36 and 37 correspondingly disengage from the segment 27, so that if for any reason the motor 6 should not be de-energized, the worm 42 would be disengaged from the gear 14, to insure that the arm 13 would be arrested.

If at any time the rate of acceleration of the vehicle should exceed a limiting value for which the inertia operated device 9 is designed, the pendulum 68 will swing to a position where contact 70 engages contact 71. This will energize the relay 117 and cause it to open its contact 116. Opening of these contacts connects a resistance 134 in series with the motor 6, to decrease the rate of rotation of the arm 13. If the rate of acceleration should reach a higher value, contact 70 will engage contact 72, and thus energize the winding 57 in the gear and clutch mechanism 7. This will cause the magnetic core member 56 to be attracted to the right and thus interrupt the friction coupling between the motor 6 and the shaft 43.

As the rate of acceleration diminishes the pendulum 68 will move to the right to perform the reverse of this operation.

Wheel sliding control

Before the brakes on the vehicle are applied the motor controller handle 61 is first moved to the illustrated position. This will disconnect the driving motors 1 and 2 from the trolley conductor 4. When the brakes are then applied the only force acting on the vehicle wheels will be the retarding force due to the application of the brakes.

When the brakes are initially applied the two tracer wheels 81 and 87 will be rotating at substantially the same speed. The ring gear 75 and its housing 76 will, therefore, be motionless. Assuming now that the vehicle wheel 82 commences to slip, the tracer wheel 81 will decrease in speed below the speed of the tracer wheel 87. The ring gear 75 will then begin to rotate and drive the shaft 95. When this shaft has reached a predetermined low speed, the weights 96 will be thrown outwardly far enough to bring the rollers 100 into engagement with the contacts 104. This will establish a circuit from the battery 11 to the control motor 6, by way of conductor 136, and contacts 104 and rollers 100, conductors 137 and 111, brush 32, and from this point on the same as previously described. Winding 45 in the gear engaging mechanism 8 will be similarly energized, so that arm 13 will be rotated until the brush 32 reaches the step 38, where it will be arrested with no further rotation taking place.

It will thus be seen that the driving motors 1 and 2 will be energized to a relatively low degree, and it is intended that this will be sufficient to keep the wheel 82 rolling and thus prevent wheel sliding.

The brakes, of course, will remain applied on this wheel, so that the wheel will be effective in retarding the vehicle to a degree proportional to the difference between the brake retarding force and the rotational force of the motors. If the speed of the wheel returns to that corresponding to the speed of the vehicle, the tracer wheels 81 and 87 will again rotate at substantially the same speed. This will cause the rollers 100 to disengage from the contacts 104, due to the action of the spring 99 when the weights 96 stop rotating, and thus open the circuit to the control motor 6 and gear engaging mechanism 8. Spring 18 will then return arm 13 to its normal or illustrated position.

This cycle will of course repeat itself until the adhesion between wheel and rail improves, or the degree of braking is sufficiently reduced.

The inertia operated device 9 will, of course, not function during operation of the wheel slip detector mechanism, because this device is operated only during acceleration of the vehicle and performs no function during deceleration.

It will thus be seen that upon slipping of a wheel or wheels associated with the two driving motors illustrated, that sufficient power will be supplied to these driving motors to keep the wheels rotating, without at the same time reducing the braking on them, and that upon return of the wheels to a normal speed condition that the driving motors will be disconnected from the source of power supply and the wheels then again effective to produce a full retarding force.

While I have illustrated my invention in connection with one particular embodiment thereof, it is not my intention to be limited to the details of this embodiment or otherwise than by the spirit and scope of the appended claims.

Having now described my invention, what I claim as new and desire to secure by Letters Patent, is:

1. In a vehicle control system, in combination, means associated with a vehicle wheel for detecting when said wheel begins to decrease in speed below that corresponding to the speed of the vehicle, and means operable in response to operation of said last means for applying a rotational force to said wheel while rotating at the decreased speed.

2. In a vehicle control system, in combination, a vehicle wheel, a motor associated with said wheel and being adapted to impart a rotational force to said wheel when current is supplied thereto, and means automatically rendered effective to supply current to the motor upon a decrease in the speed of rotation of the wheel with respect to the speed of the vehicle.

3. In a vehicle control system, in combination, a driving motor associated with a vehicle wheel, wheel slipping detecting means associated with said wheel and having an element operated when said wheel begins to slip, and means rendered effective upon operation of said element for effecting a supply of current to said motor.

4. In a vehicle control system, in combination, a vehicle wheel, a motor associated with said wheel and being adapted to drive said wheel when connected to a source of power supply, and means operable when said wheel begins to slip for connecting said motor to a source of power supply, and for maintaining said motor connected to said source of supply until said wheel ceases to slip.

5. In a vehicle control system, in combination, a drive motor associated with a vehicle wheel and being adapted to drive said wheel when connected to a source of power supply, manually controlled means for connecting said motor to a source of power supply, and means effective upon slipping of said wheel for connecting said motor to a source of power supply independently of operation of said manually controlled means.

6. In a motor control system, in combination, a drive motor associated with a vehicle wheel, manually operated means for connecting said motor to a source of power supply, and means associated with said wheel and operable when said wheel decreases in speed below that corresponding to the speed of the vehicle for independently connecting said motor to a source of power supply.

7. In a vehicle motor control system, in combination, a drive motor associated with a vehicle wheel, manually controlled means for connecting said motor to a source of current supply, and means operable at a predetermined speed to connect said motor to said source of current supply at a time when said manually controlled means has disconnected said motor from said source.

8. In a vehicle motor control system, in combination, a motor associated with a vehicle wheel, acceleration control means for supplying current to said motor according to a desired acceleration, and a differential mechanism operable automatically upon slipping of said wheel for effecting a supply of current to said motor by operation of said acceleration control means.

9. In a vehicle motor control system, in combination, a vehicle wheel, a motor associated with said wheel and adapted to drive said wheel when current is supplied to said motor, a plurality of circuits adapted to be selectively connected to a source of current supply to effect a supply of current to said motor to different degrees, and means associated with said wheel and operable upon a predetermined decrease in the speed of rotation of said wheel below that corresponding to the speed of the vehicle for connecting one of said circuits to a source of current supply.

10. In a vehicle motor control system, in combination, a motor associated with a vehicle wheel, a plurality of circuits adapted to be selectively energized to effect a supply of current to said motor to different degrees, means having normally opened contacts and an element adapted to close said contacts when rotated above a predetermined speed, and means whereby closing of said contacts connects one of said circuits to a source of current supply.

11. In a vehicle motor control system, in combination, a motor associated with and adapted to drive a vehicle wheel, a motor controller having a handle movable to different positions to effect a supply of current to said motor to different degrees, wheel slipping detecting means having contacts operable upon slipping of said vehicle wheel, and means effective when said contacts are operated for effecting a supply of current to said motor corresponding to one of the positions of said handle.

12. In a vehicle motor control system, in combination, a vehicle drive motor adapted to drive a vehicle wheel, an element adapted to be rotated, and means operable when said element is rotated above a predetermined speed and at a time when said motor is disconnected from a source of current supply for effecting a supply of current to said motor.

13. In a vehicle motor control system, in combination, a vehicle wheel, a motor adapted to drive said wheel when current is supplied thereto, means including normally open contacts adapted when closed to effect a supply of current to said motor, and means operable when rotated above a predetermined speed to close said contacts.

14. In a vehicle motor control system, in combination, a vehicle drive motor, an element adapted to be rotated upon slipping of a vehicle wheel, and means operable in response to rotation of said element for connecting said motor to a source of power supply.

15. In a vehicle motor control system, in combination, a vehicle drive motor associated with a vehicle wheel, a mechanism having an element rotated according to the speed of rotation of the vehicle wheel and another element rotated according to the linear speed of the vehicle, and means operated upon a predetermined difference in the speed of rotation of said two elements for effecting a supply of current to said motor.

16. In combination, a motor associated with a vehicle wheel, a wheel slipping detecting mechanism having a rotating element driven according to the speed of rotation of said wheel and a second rotating element driven according to the linear speed of the vehicle, means including normally open contacts adapted to be closed upon a predetermined difference in the speed of rotation of said two elements, and means responsive to closing of said contacts for connecting said motor to a source of power supply.

17. In a vehicle control system, in combination, a motor associated with a vehicle wheel and adapted to drive said wheel when current is supplied to the motor, a wheel slipping detecting mechanism having a first tracer wheel driven by said vehicle wheel and a second tracer wheel in rolling engagement with a track rail, and having normally open contacts adapted to be closed upon a predetermined difference in speed of rotation of said two tracer wheels, and means responsive to closing of said contacts for effecting a supply of current to said motor.

18. In a vehicle motor control system, in combination, a motor, current controlling means for controlling the supply of current to said motor, two parallel circuits each of which is adapted when connected to a source of current supply to effect operation of said current controlling means, manually operated means for connecting one of said circuits to a source of current supply, and means operable at a predetermined speed of rotation thereof to connect the other of said circuits to a source of current supply.

CARLTON D. STEWART.